United States Patent Office 3,397,177
Patented Aug. 13, 1968

3,397,177
CURING AGENT COMPOSITION AND USE
IN CURING POLYEPOXIDES
Ralph E. Stolton, Surbiton, England, assignor to Shell
Oil Company, New York, N.Y., a corporation of
Delaware
No Drawing. Filed Oct. 6, 1966, Ser. No. 584,676
Claims priority, application Great Britain, Feb. 2, 1966,
4,589/66
19 Claims. (Cl. 260—47)

This invention relates to new curing agent compositions and to their use for curing polyepoxides. More particularly, the invention relates to new curing compositions which are effective at low reaction temperatures, and to the use of the compositions for the conversion of polyepoxides to hard insoluble and infusible products.

Specifically, the invention provides new and highly efficient curing agent compositions which are particularly effective for curing epoxy resins at temperatures as low as 0° C. which comprise a mixture of (1) an aromatic polyamine which contains in its molecular structure primary and/or secondary amino groups, (2) a polyalkylene sulfone, (3) an accelerator comprising salicyclic acid and/or lactic acid, and (4) optionally a 1,3-dioxolan-2-one. The invention also provides a process for using these curing compositions to convert polyepoxides having more than one vic-epoxy group to hard, insoluble infusible products which comprises mixing and reacting the polyepoxide with a curing amount of the said novel curing compositions and maintaining the mixture at the desired curing temperature which is preferably between 0° C. and about 30° C. The present invention also includes the cured product prepared by this process and articles coated with the epoxy resin.

It is known that polyepoxides, such as the commercially available glycidyl polyethers of polyhydric phenols, can be cured to insoluble infusible products by reaction with aromatic amines at high temperatures. This is undesirable for certain applications, such as surface coatings for large areas, such as highways and the like, where it is difficult to maintain the high temperature. It has been possible to utilize certain other types of agents, such as polymercaptans, to obtain a cure at a lower temperature, but the addition of such agents brings about other difficulties, such as odor, limited physical properties and the like.

It is an object of the invention, therefore, to provide a new class of curing agents for polyepoxides. It is a further object to provide new curing agents and a method for their preparation. It is a further object to provide new curing agent compositions which can be used to cure polyepoxides at low temperatures. It is a further object to provide new curing agent compositions which cure at low temperatures to give products having outstanding properties. It is a further object to provide new curing agent compositions which are particularly suited for use in preparation of epoxy resin surface coating compositions. It is a further object to provide new curing agent compositions which are particularly suited for use in curing epoxy resin coatings for large areas, such as roadways and walkways. Other objects and advantages of the invention will be apparent from the following detailed description thereof.

It has now been found that these and other objects can be accomplished by the new curing agent compositions of the invention comprising a mixture of (1) an aromatic polyamine which contains in its molecular structure primary and/or secondary amino groups, (2) a polyalkylene sulfone, (3) an accelerator comprising salicyclic acid and/or lactic acid, and (4) optionally a 1,3-dioxolane-2-one. These compositions can be used to curing epoxy resins and convert them to insoluble infusible products of superior physical properties by mixing and reacting the polyepoxide with a curing amount of the above-noted curing compositions and maintaining the temperature of the mixture at the desired temperature which is preferably between 0° C. and 30° C. It has been found that these new curing compositions permit the polyepoxides to be cured at a fast rate at the low reaction temperatures and give products having superior properties. These advantages of the new composition are shown in the working examples at the end of the specification.

Any suitable polyepoxide, i.e., a material possessing more than one vic-epoxy group, can be used in carrying out the process of the present invention; for example, suitable polyepoxide can be produced by reacting polyhydric phenols or polyhydric alcohols with either epichlorohydrin or epibromohydrin in an alkaline medium. The polyhydric phenols can contain in their molecular structure one or more aromatic nuclei. Examples of the polyhydric phenols are mononuclear polyhydric phenols, for example, alkylated or unalkylated resorcinols, catechols, pyrogallols and hydroquinones, and dinuclear phenols, for example, 4,4'-dihydroxybenzophenone, 1,2-di(4'-hydroxyphenyl)ethane and 2,2-di(4'-hydroxyphenyl)propane, which is known as Bisphenol A, and tetrahydric phenols, for example, tetraphenylol ethane. Examples of suitable polyhydric alcohols are glycerol, trimethylol propane and pentaerythritol. However, the epoxy resin can conveniently have a molecular weight below 1,200 and more conveniently below 600. The epoxy resin is preferably a liquid. Very suitable epoxy resins are derived from Bisphenol A and have molecular weights in the range of from 300 to 500 and contain at least 1.6 vic-epoxy groups per molecule.

Examples of suitable liquid epoxy resins are diglycidyl phthalate and the diglycidyl ether of Bisphenol A. Epoxy resins derived from Bisphenol A are preferably used. They can be prepared by reacting epichlorohydrin in an alkaline medium with Bisphenol A, the molar ratio of epichlorohydrin to Bisphenol A being at least 4:1 and preferably 10:1. These preferred resins have molecular weights of 300 to 500 and contain an average of at least 1.6 vic-epoxy groups per molecule.

Other examples of suitable polyepoxides may be found in U.S. 2,633,458.

1,3,5-triaminobenzene is an example of an aromatic polyamine which can be used in accordance with the process of the present invention. However, from the point of view of the mechanical properties of the cured resin aromatic diamines are preferred. Examples of aromatic diamines which can be used are 1,2-diphenylene diamine, 1,3-diphenylene diamine, 1,4-diphenylene diamine, 4,4'-diaminodiphenylamine, 4,4'-diaminodiphenyl sulfide, 4,4'-diaminodiphenyl sulfone, 2,2'-diaminodiphenylmethane, 4,4'-di(N-methylamino)diphenylmethane, 4,4'-di(N-ethylamino)diphenylmethane and 4,4'-di(N-butylamino)diphenylmethane. From the point of view of the mechanical properties of the cured resin the preferred aromatic diamines are 3,3'-diaminodiphenyl, 3,'4-diaminophenyl, 4,4' - diaminophenyl, 3,3'-diaminodiphenyldimethylmethane, 3,4'-diaminodiphenyldimethylmethane and 4,4'-diaminodiphenyldimethylmethane. The more preferred aromatic amines are 3,3'-, 3,4'- and 4,4'-diaminodiphenylmethanes.

Examples of the polyalkylene sulfone which can be used in accordance with the present invention are trimethylene sulfone, 3,3 - dimethyltrimethylene sulfone, pentamethylene sulfone, 2-methyltetrahydro-1-thiapyran-1,1-dioxide, 3-methyltetrahydro-1,1-thiapyran-1,1-dioxide and 4 - methyltetrahydro-1-thiapyran-1,1dioxide. Tetramethylene sulfone, which is also known as sulfolane, is the preferred polyalkylene sulfone, because of its availability.

Examples of the optional 1,3-dioxolan-2-one which can be used in accordance with the present invention are 1,3-dioxolan-2-one, which is also known as ethylene carbonate, 4-methyl-1,3-dioxolan-2-one, which is also known as propylene carbonate, 4-ethyl-1,3-dioxolan-2-one and 4,5-dimethyl-1,3-dioxolan-2-one. If desired, a mixture of 1,3-dioxolan-2-ones can be used, for example, a mixture of ethylene and propylene carbonates.

The process of the present invention can conveniently be carried out in the absence of the optional 1,3-dioxolan-2-one at a temperature above about 10° C. The process of the present invention can also conveniently be carried out in the presence of the optional 1,3-dioxolan-2-one at a temperature of about 0° C. Those skilled in the art will appreciate that this represents a valuable technical contribution to the art for, although it has been possible hitherto to harden epoxy resins at temperatures as low as 0° C., as far as the applicant is aware, it has not been possible to cure epoxy resins at such temperatures.

The process of the present invention is preferably carried out in the presence of a 1,3-dioxolan-2-one or a mixture of 1,3-dioxolan-2-ones, the polyalkylene sulfone and the 1,3-dioxolan-2-one(s) being present in such quantities that a solution of the aromatic polyamine in the polyalkylene sulfone and the 1,3-dioxolan-2-one(s) does not crystallize on standing for 6 months at 0° C. When the process is carried out in the presence of a reaction solvent consisting of sulfolane and either ethylene or propylene carbonates or a mixture of ethylene and propylene carbonates, the reaction solvent preferably comprises not less than 20% by weight of sulfolane.

The amount of the aromatic polyamine used can be varied within wide limits, for example, it can be from 80 to 120% of the stoichiometric quantity required for reaction with the vic-epoxy groups of the polyepoxide. Preferably, the amount of the aromatic polyamine used can be from 92 to 108% of the said stoichiometric quantity. More preferably, the amount of the aromatic polyamine used can be form 95% to 105% of the said stoichiometric quantity.

The amount of the cure accelerator can be varied within wide limits, for example, it can be present in an amount between 0.1 and 10% by weight of the polyepoxide. The preferred amount of the cure accelerator is from 0.3 to 5% by weight of the polyepoxide.

If the polyepoxide is cured at temperatures of from about 15 to about 30° C. it is preferred to use lactic acid as the cure accelerator but if the epoxy resin is cured at temperatures of from about 0 to about 10° C., it is preferred to use salicyclic acid as the cure accelerator. A system which comprises as the cure accelerator a mixture of lactic and salicyclic acids can conveniently be used for curing the polyepoxide over a temperature range from about 0 to about 30° C.

The activity of lactic acid as a cure accelerator present in a solution of the aromatic polyamine in a polyalkylene sulfone and, optionally, either a 1,3-dioxolan-2-one or a mixture of 1,3-dioxolan-2-ones decreases with time and so such a solution should preferably be used for curing a polyepoxide within one month of its preparation.

The process of the present invention can be carried out in the presence of a so-called reactive diluent, which is known in the art for the purpose of reducing the viscosity of polyepoxides. The quantity of the reactive diluent can be, for example, from 5 to 15 parts by weight per 100 parts by weight of the polyepoxide. Examples of the reactive diluent are pine oil, furfuryl alcohol and alkyl glycidyl ethers. n-Butyl glycidyl ether and iso-octyl glycidyl ether are examples of alkyl glycidyl ethers which can be used.

The polyepoxides can be cured conveniently at low temperature by contacting with a 45 to 55% by weight solution of a 3,3'- or 3,4'- or 4,4'-diaminodiphenylmethane in a reaction solvent consisting of from 50 to 90% by weight of sulfolane and from 10 to 50% by weight of ethylene carbonate in the presence of salicyclic acid as the cure accelerator.

The present invention is illustrated by the following examples:

Example I 100 parts by weight of a diglycidyl ether of 2,2-bis(4-hydroxyphenyl)propane (Bisphenol A) known as Epon resin 828 having a molecular weight of 370 and containing at least 1.9 vic-epoxy groups per molecule were mixed at a temperature of 0–3° C. with a mixture comprising 25 parts by weight of 4,4'-diaminodiphenylmethane, 5 parts by weight of ethylene carbonate, 20 parts by weight of sulfolane and 3 parts by weight of salicyclic acid. The resultant mixture was applied by means of a brush to shot-blasted mild steel panels which had been cooled to 0–3° C. The resin films became surface dry in 20 hours and hard dry in 48 hours.

Example II 100 parts by weight of the diglycidyl ether of Example I were mixed with a mixture comprising 25 parts by weight of 4,4'-diaminodiphenylmethane, 5 parts by weight of ethylene carbonate, 20 parts by weight of sulfolane and 2 parts by weight of lactic acid. The resultant mixture was applied by means of a brush to shot-blasted mild steel panels at 23° C. The resin films became surface dry in 6 hours and hard dry in 20 hours.

Resin films applied at a dry film thickness of 12–15 mil had the following properties after cure for 7 days at 23° C:

(a) Buchholtz hardness _____ 110
(b) Impact adhesion
    (i) Direct _____inches pounds__ 48
    (ii) Indirect _____inches pounds__ 10
(c) Flexibility (Mandrel Test) _____ good

Example III 100 parts by weight of a glycidyl polyether of 2,2-bis(4-hydroxyphenyl)propane which consisted of 85–90% by weight of the said liquid glycidyl polyether, 10–15% by weight of n-butyl glycidyl ether with an epoxide equivalent weight of 185–205, were mixed in a mold at a temperature of 0.5° C. with a mixture comprising 25 parts by weight of 4,4'-diaminodiphenylmethane, 17 parts by weight of sulfolane, 5 parts by weight of ethylene carbonate, and 3 parts by weight of salicyclic acid. The resultant casting was cured for 7 days at a temperature of 0–3° C. It had the following properties:

Flexural strength _____p.s.i__ 8,300
Tensile strength _____p.s.i__ 4,100
Elongation, percent _____ 45

The flexural strength was determined according to ASTM Test No. D 790–59T and the tensile strength and elongation were determined according to ASTM Test No. D 638–60T.

Example IV

Example III was repeated, save that the reactants were mixed in a mold at 23° C. and the resultant casting was cured for 7 days at a temperature of 23° C. The casting had the following properties:

Flexural strength _____p.s.i__ 13,800
Tensile strength _____p.s.i__ 4,100
Elongation, percent _____ 14

Example V

A laminate, prepared using three plies of chopped strand glass mat and a reaction mixture comprising 100 parts by weight of the glycidyl polyether of Example I, 25 parts by weight of 4,4'-diaminodiphenylmethane, 17 parts by weight of sulfolane, 5 parts by weight of ethylene carbonate, and 3 parts by weight of salicyclic acid, was made at a working temperature of 0–3° C. on a steel plate which had been cooled to 0–3° C. The flexural strength of the laminate was 19,000 pounds per square inch after curing for 7 days at 0–3° C.

Example VI

Example V was repeated, save that the laminate was made at a working temperature of 23° C. The flexural strength of the laminate was 27,500 pounds per square inch after curing for 7 days at 23° C.

Example VII

Example I is repeated with the exception that the diaminodiphenylmethane is replaced by each of the following: 1,3,5-triaminobenzene, 1,3-diphenylene diamine, 4,4'-diamino-diphenyl sulfone. Related results are obtained in each case.

Example VIII

Examples I to VII are repeated with the exception that the polyepoxide is replaced by each of the following: resorcinol diglycidyl ether, diglycidyl phthalate, glycidyl ether of a formaldehyde-phenol resin, and triglycidyl ether of glycerol. Related results are obtained.

I claim as my invention:

1. A process for curing a polyepoxide having more than one vic-epoxy group having an average number of vic-epoxy groups per molecule of more than one which comprises contacting the epoxy resin with an aromatic polyamine which contains in its molecular structure primary and/or secondary amino groups in the presence of a polyalkylene sulfone and a cure accelerator, said cure accelerator comprising salicyclic acid and/or lactic acid.

2. A process as claimed in claim 1, wherein the polyepoxide is cured in the presence of a 1,3-dioxolan-2-one.

3. A process as claimed in claim 2, wherein the 1,3-dioxolan-2-one is ethylene carbonate.

4. A process as claimed in claim 2, wherein the 1,3-dioxolan-2-one is propylene carbonate.

5. A process as claimed in claim 1, wherein the polyepoxide is cured in the presence of a mixture of 1,3-dioxolan-2-ones.

6. A process as claimed in claim 5, wherein the mixture of 1,3-dioxolan-2-ones comprises a mixture of ethylene carbonate and propylene carbonate.

7. A process as in claim 2, wherein the polyalkylene sulfone and either the 1,3-dioxolan-2-one or the mixture of 1,3-dioxolan-2-ones are present in such quantities that a solution of the aromatic polyamine in a polyalkylene sulfone and either the 1,3-dioxolan-2-one or the mixture of 1,3-dioxolan-2-ones does not crystallize on standing for 6 months at 0° C.

8. A process as in claim 1, wherein the polyalkylene sulfone is sulfolane.

9. A process as in claim 2, wherein the polyalkylene sulfone is sulfolane which is present in an amount of not less than 20% of the combined weight of sulfolane and either the 1,3-dioxolan-2-one or the mixture of 1,3-dioxolan-2-ones.

10. A process as claimed in claim 3, wherein the aromatic polyamine is 3,3'- or 3,4'- or 4,4'-diaminodiphenylmethane, the cure accelerator is salicyclic acid and the polyepoxide is contacted with a 45 to 55% by weight solution of the aromatic polyamine in a reaction solvent consisting of from 50 to 90% by weight of sulfolane and from 10 to 50% by weight of ethylene carbonate.

11. A process as in claim 1, wherein the aromatic polyamine is 3,3'- or 3,4'- or 4,4'-diaminodiphenylmethane.

12. A process as in claim 1, wherein the epoxy resin has a molecular weight below 1,200.

13. A process as in claim 1, wherein the polyepoxide is cured in the presence of a reactive diluent.

14. A process as in claim 13, wherein the reactive diluent is an alkyl glycidyl ether.

15. A process as in claim 1, wherein the quantity of the aromatic polyamine is from 80 to 120% of the stoichiometric quantity required for reaction with the vic-epoxy groups of the polyepoxide.

16. A process as in claim 15, wherein the quantity of the aromatic polyamine is from 92 to 108% of the said stoichiometric quantity.

17. A new curing agent composition comprising a mixture of (1) an aromatic polyamine which contains in its molecular structure primary and/or secondary amino groups, (2) a polyalkylene sulfone, (3) salicyclic acid or lactic acid.

18. A composition as in claim 17 wherein the mixture also contains a 1,3-dioxolan-2-one.

19. A new curing agent composition as in claim 18 wherein the aromatic polyamine is 50 parts diamino diphenyl methane, the sulfone is 35.2 parts sulfolane, the accelerator is 6.0 parts salicyclic acid, and the 1,3-dioxolan-2-one is 8.8 parts ethylene carbonate.

References Cited

UNITED STATES PATENTS 2,893,973   7/1959   Steckler et al.

WILLIAM H. SHORT, *Primary Examiner.*

T. D. KERWIN, *Assistant Examiner.*